US005577744A

United States Patent [19]
Parks

[11] Patent Number: 5,577,744
[45] Date of Patent: Nov. 26, 1996

[54] UTILITY CART

[76] Inventor: James E. Parks, 220-C Foxtail Dr., West Palm Beach, Fla. 33415

[21] Appl. No.: 438,264

[22] Filed: May 9, 1995

[51] Int. Cl.⁶ .................................................. B62B 3/02
[52] U.S. Cl. ........................................ 280/32.6; 280/639
[58] Field of Search ........................ 280/30, 32.5, 32.6, 280/35, 37, 42, 638, 639, 642, 647, 655, 655.01, 87.01, 87.021, 47.315, 47.33, 47.38, 47.4

[56] References Cited

U.S. PATENT DOCUMENTS

| | | | |
|---|---|---|---|
| 1,349,941 | 8/1920 | Broome | 280/32.6 |
| 1,737,836 | 12/1929 | Field | 280/32.6 |
| 2,054,598 | 9/1936 | Goldenberg | 280/32.6 |
| 2,186,368 | 1/1940 | Conger | 280/35 |
| 2,564,323 | 8/1951 | Brown | 280/32.6 |
| 2,595,784 | 5/1952 | Griffin et al. | 280/32.6 |
| 3,092,394 | 6/1963 | Burke | 280/32.6 |
| 3,137,511 | 6/1964 | Weil et al. | 280/30 |
| 4,896,480 | 1/1990 | Brooks et al. | 280/32.6 |
| 5,108,118 | 4/1992 | Schaevitz | 280/32.6 |
| 5,184,446 | 2/1993 | Gustavsen | 52/746 |
| 5,257,799 | 11/1993 | Cone et al. | 280/642 |
| 5,433,459 | 7/1995 | Liu | 280/30 |

*Primary Examiner*—Brian L. Johnson
*Assistant Examiner*—Frank Vanaman
*Attorney, Agent, or Firm*—McHale & Slavin, P.A.

[57] ABSTRACT

A multi-purpose utility cart having a rigid wheeled platform with a cushion secured to an upper surface of the platform and a set of interchangeable wheels along a lower surface. A support bracket having a rotatable pad is coupled to pivot members mounted on the platform by leg members. The leg members are movable and can be secured in most any angular position thereby allowing the support bracket to be used as a back support, a chest support, or a head support.

7 Claims, 2 Drawing Sheets

UTILITY CART

FIELD OF THE INVENTION

This invention relates generally to movable platforms and more particularly to a multi-function utility cart having an adjustable support structure allowing the cart to be used in a seated, reclining, or kneeling position.

BACKGROUND OF THE INVENTION

Carts are used to assist an individual in the movement of objects. The types of carts that exist, and the type of items that can be moved, are too numerous to list. However, carts can be generally classified as either a utility or specialty cart. A utility cart does not have any particular use. For instance, a two wheeled platform known as a dolly is commonly used by movers to relocate any object that may otherwise place a strain on the human body. Whereas a specialty cart is typically limited to a specific purpose. A grocery cart holds groceries; a stool supports an individual in a sitting position; a creeper holds an individual in a flat position; and so forth. The problem with utility carts is that there is no predictability with use while the problem with specialty carts is that unless the individual uses it in business, they are grossly under-utilized and if purchased typically become storage paraphernalia for the average purchaser.

The aforementioned creeper cart is an excellent example of a specialty cart that provides an important function but is not practical for the average homeowner. A conventional creeper cart consists of a flat rigid platform having wheels located on an underside to allow for ease of movement and a pad located on the upper surface to support the individual's head. The creeper provides support to the human body while working in tight areas such as under cars and is slid beneath a vehicle facilitating access to the underside of the vehicle. The problem with the creeper is that unless an individual works on an automobile all the time, it is not a practical investment. Further, even if an individual such as a mechanic does work constantly on an automobile there are many components that need not be repaired in a lying down position wherein a reclining or sitting position is preferred. This necessitates the use of modified creepers such as those found in the prior art.

U.S. Pat. No. 4,895,380 discloses a creeper having an adjustable support platform. The cart allows for at least a portion of the support surface to be placed at a angular slope by tilting the platform. Provisions are made to allow adjustment to the support surface while a load is placed on the surface. A cushion is provided for the head resting area. The creeper cart remains a specialty cart as its primary function despite tilting of the platform for working beneath an automobile.

U.S. Pat. No. 5,108,118 discloses another creeper also having a support surface that can be tilted. This support surface is supported by a wire stand that hooks into predefined slots along the back side of the support surface. Increased maneuverability is claimed by offset placement of the support wheels, however this cart also remains a specialty cart for use beneath an automobile.

U.S. Pat. No. 5,184,446 discloses another a type of cart based upon a support platform and is used for installing flooring. This cart requires an individual to place their body weight on top of the platform so as to provide pressure for proper adhesive attachment of various types of flooring. This cart is limited in its function for installing flooring and would not operate as a creeper.

Carts for various other functions would be most beneficial such as a stool cart that would allow an individual to sit in a lowered position yet remain raised from a cold floor and retain an ability to move. For instance, in the aforementioned mechanic example, the ability to work on the brakes of a vehicle is performed while in a sitting position wherein a wheeled stool is desirable. This wheeled stool is not limited to mechanics for even a housekeeper would find it most beneficial for sitting while arranging dishes, pots, or pans in a lower cabinet.

In addition, there are many instances in which a support platform would be beneficial to allow an individual to work while supported. For instance, a wheeled kneeling platform would assist in those instances where an individual cleans a floor, installs tiling, cleans grout, paints a pool bottom, and so forth. The aforementioned creeper carts are not accommodating for such uses requiring an individual to either purchase a number of specialty carts or do without.

Thus, what is lacking in the art is a utility cart capable of multiple functions providing the convenience of a creeper, stool, and recliner with additional provisions to allow an individual to have proper support while in a kneeling position.

SUMMARY OF THE INVENTION

The instant invention is a utility cart satisfying the need for a maneuverable multi-purpose service cart by providing a rigid platform receptive to an individual in a lying, reclining, sitting, or kneeling position. A pivotal support bracket is coupled by a first and second leg to an upper surface of the platform used to support the body in a variety of positions and can be rotated in predefined increments over a 180° range.

In an open position, the utility cart assimilates a creeper wherein an individual may lay in a flat position and work beneath an automobile similar to the previously mentioned creepers. When the support bracket is rotated into a closed position, the utility cart is storable in a compact position. The support bracket can be angularly positioned between the open and closed position wherein a rotatable support pad allows for a variety of support bracket uses. The legs to the support bracket are locked into pivot members by a releasable locking pin for ease in placement to appropriate position for supporting the body. In addition, the support wheels can be exchanged for casters or pressure rollers to accommodate a particular function.

The platform and support bracket is padded to lessen body strain or stress when kneeling or lying on the platform. This is particularly advantageous when the device is used to support the body in an awkward position. For instance, the apparatus allows an individual to kneel on the cushioned platform and lean over the padded support structure providing proper support when installing, cleaning, or painting floors. If the floor has an uneven surface such as paver tile, the use of oversized wheels allow the utility cart to be easily maneuvered. If the flooring is being laid, then larger wheels provide even weight distribution to assist in setting of the floor.

An angular placement of the support bracket allows an individual to thus permitting work on objects at a higher stance. For instance, the increased height allows a mechanic to work on raised vehicles such as pick-ups. The angle has particular benefit to the plumber wherein the offset of the wheels allows a plumber to extend his head to a position inside of a cabinet. The upright position further allows the utility cart to be used as a seat.

In operation, the support bracket is moved from a storage position by unlocking of a latch mechanism which maintains the support bracket in the closed position by securing the leg support members in a fixed position. The support bracket can be rotated into an upright, horizontal, or angular position as desired. For instance, if the support platform is placed in an upright position, a pad on the front of the support bracket may be rotated so as to provide a comfortable seating area with back support. In the upright position an individual can also kneel on the cushioned support platform and rotate the pad on the support bracket into a parallel plane to the planar platform thus allowing the individual to place their chest across the support bracket which allows both hands to be free to perform various tasks. The support bracket can then be placed in the angular position allowing an individual to sit on the platform in a reclined position to work beneath areas with the pad operating as a headrest. The cushion on the planar platform is positioned to prevent the individual from sliding off the platform. The support bracket can also be rotated to predetermined angular positions all the way into the aforementioned horizontal plane wherein the apparatus operates as a creeper.

Thus, an objective of the instant invention is to provide a low cost utility cart having a movable support bracket providing back, chest, or head support for proper support of the body while doing chores such as painting, repairing, cleaning decks, patios, pools, baseboards, working on cars, plumbing, floors, and so forth.

Another objective of the instant invention is to provide a utility cart having interchangeable wheels which allows the cart to be used on a variety of surfaces.

Yet another objective of the instant invention is to provide a simplified latching mechanism which rigidly secures a support bracket in various positions.

Other objectives and advantages of this invention will become apparent from the following description taken in conjunction with the accompanying drawings wherein are set forth by way of illustration and example, certain embodiments of this invention. The drawings constitute a part of the specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
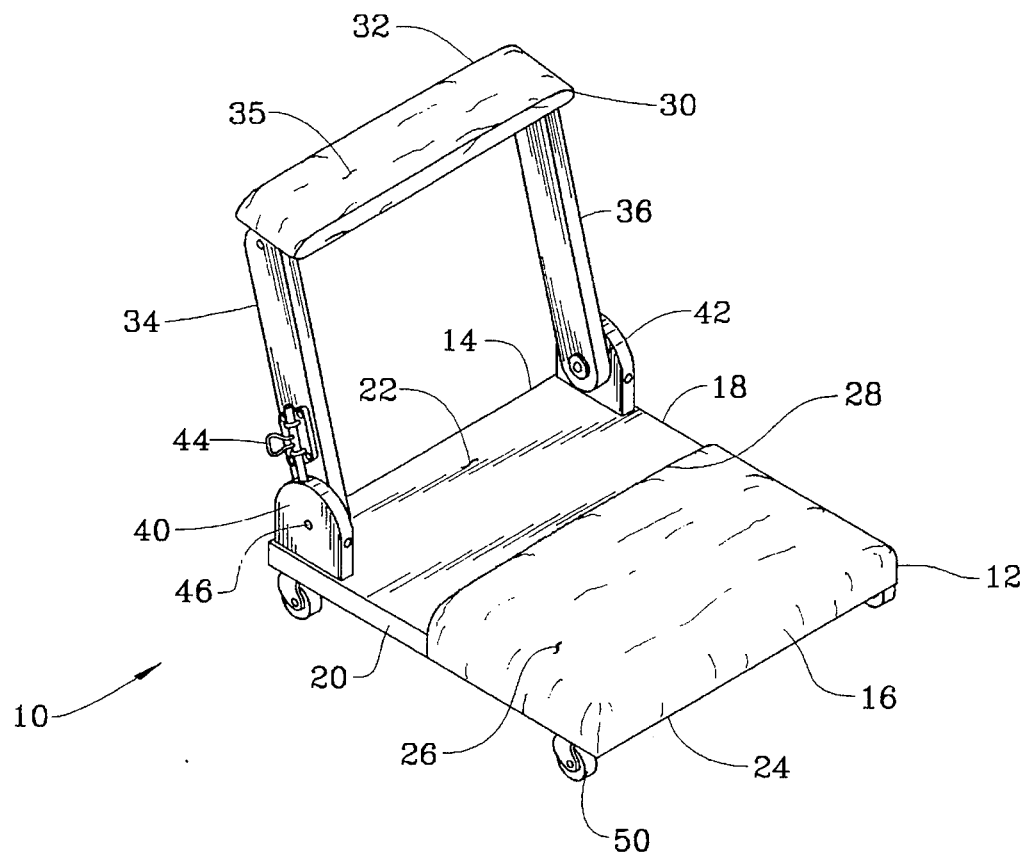
FIG. 1 is a perspective view of the instant invention with the support bracket placed in an upright perpendicular position.

Now referring to FIG. 1, shown is the utility cart 10 of the instant invention having a rigid planar platform 12 defined by a front edge 14, a rear edge 16, a side edge 18, and a second side edge 20. The platform is substantially rectangular in shape with an upper surface 22 and a lower surface 24. Cushion 26 is secured to the upper surface of the platform 12 to comfort the user from the rigidity of the platform. A front section 28 of the cushion 26 is sloped to inhibit a person from sliding off the platform when used to position a person angular relative to the platform. So as to provide the teachings of a utility cart capable of working on various surfaces, wheels 50 are detachable and the cart receptive to alternative wheels for various surfaces.

A support bracket 30 is coupled to the platform having a cross brace pivotally connected to a first leg 34 and second leg 36. The bracket 30 is a substantially rectangular rigid structure having a pad 32 disposed on one side surface of the bracket with a pivot connection located along a bottom surface of the support bracket for coupling to the ends of legs 34 and 36. The first leg 34 is pivotally coupled to a first pivot member means 40 secured to the upper surface 22 of the platform 12 along the corner formed by front edge 14 and side edge 18. Similarly, a second pivot member means 42 is secured to the upper surface 22 by the corner formed by front edge 14 and side edge 20 for support of second leg 36. Each leg is secured in position to its receptive pivot member by a locking mechanism assimilating the hasp 44 depicted on a side surface of leg 34.

The platform is supported by the wheels 50 along each corner of the platform 12 so as to maintain the platform 12 a fixed distance above the surface of the ground. The type of wheels employed is dependent upon the type of surface the cart 10 is to be used on. Where the primary use of the cart is on marble floors, soft caster wheels are preferred which will not leave surface marks. If the cart is used on rough surfaces such as the non-skid surface provided around the perimeter of a pool or garage floor, wheels constructed of a hard material are preferable as the non-skid surface will prematurely wear out soft wheels. In addition a garage application makes it preferable to use wheels that will allow the surface of the cart to be placed as close to the floor as possible allowing maximum clearance for a person servicing an automobile from beneath the automobile.

It will be obvious to one of ordinary skill in the art to recognize that the cart of the instant invention having a fixed design wheel is within the scope of this invention. Yet it is further noted that the wheels may be made of a large diameter and/or width which provides for a wide distribution of pressure for use in installing floors.

Figure 2:
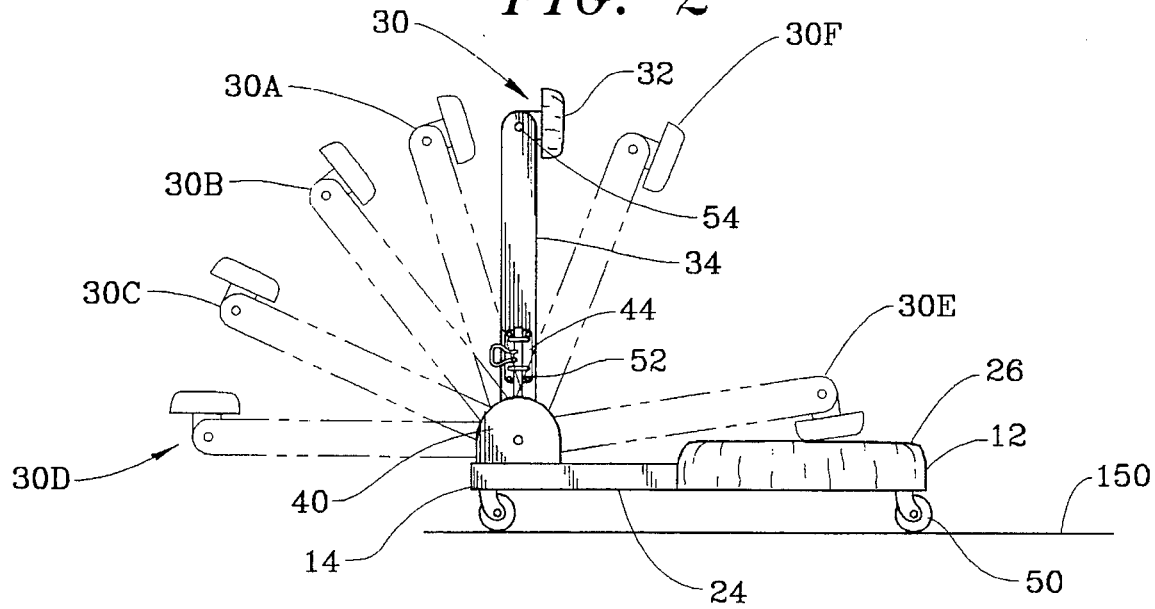
FIG. 2 is a side view of the instant invention with hidden lines depicting the various support bracket placements.

Referring to FIG. 2 shown is a side view of the instant invention with the platform 12 set a distance above the ground level 150 by use of the aforementioned wheels 50. The support bracket 30 is shown in a upright perpendicular position to the first pivot member 40 and secured in position by insertion of hasp locking bolt 52 into one of the apertures located on the first pinion member. In this position, an individual may sit on the cushion 26 with the pad 32 operating as a back support for use in working on car brakes, rearranging cabinets, and the like type of task where a person must be positioned low to the ground for a prolonged period of time necessitating mobility and proper back support for comfort. The pad 32 is shown at a right angle to the first leg 34 as it is rotated about axis 54. Although not shown, the pad 32 may be rotated about axis 54 wherein the surface of the pad 32 is placed perpendicular to the surface of the planar support 12 thus allowing a person to kneel on the cushion 26 and place their chest on pad 32 thereby providing proper posture and support while the individual is laying tile, cleaning floors, painting pool patios, and coating pool floors, and/or basement floors, and the like type of task that necessitates a person to be on their knees for a substantial period of time and work in front of edge 14. The wheels 50 allow the cart to be easily moved so as to increase the comfort while working in that position. The locking mechanism 44 secures the leg 34 in an upright position as will be described later in this specification.

Numeral 30A depicts the support bracket in a second position which allows angular support in the same manner as the first position thereby allowing comfort while an individual is situated upon cushion 26 and/or provide support for a person's chest while the person is required to work in the kneeling position. Movement of the support bracket from the upright position to the position enumerated by 30A is performed by lifting locking bolt 52 from first pivot member 40 to a second aperture, not shown, on the top of the first pivot member when the hasp allows the leg 34 to be locked in the appropriate position. It is noted that second pivot member 42 includes a locking mechanism for attachment to the second leg in a similar manner as the previous locking mechanism. In this embodiment this includes a hasp for support of the legs, but could include other arresting means.

Numeral 30B depicts the support bracket at an approximately 45° angle which is beneficial in instances where an individual needs to work in a reclined position to reach raised objects when working beneath larger items such as a pickup truck. In addition, this angle has particular advantage for workmen such as plumbers who are required to work at a reclined position such as that needed when working underneath a sink. The angle provides proper support while working at that position yet maintains sufficient clearance for clearing kick panels. Numeral 30C sets forth yet another angled position having similar usefulness to the aforementioned angle.

Numeral 30D sets forth a fifth position wherein the support bracket is placed in a parallel horizontal plane to the platform 12. In this instance the cart operates as a conventional creeper allowing a person to lie flat so as to work on the underside of an automobile in a manner commonly performed by automobile mechanics. Pad 32 operates as a head cushion in a similar manner to the conventional mechanics creeper. Numeral 30E depicts the support structure in a storage position with pad 32 folded over cushion 26 making the device compact so as to lessen the demands on a storage facility. Numeral 30F depicts the support structure in a forward sitting position for positioning an individual directly over the cushion. Unlike the upright position illustrated by numeral 30, the forward sitting position maintains the individual towards the rear of the cart to prevent the normal inclination of leaning backwards in an effort to remain on the seat cushion.

Figure 3:
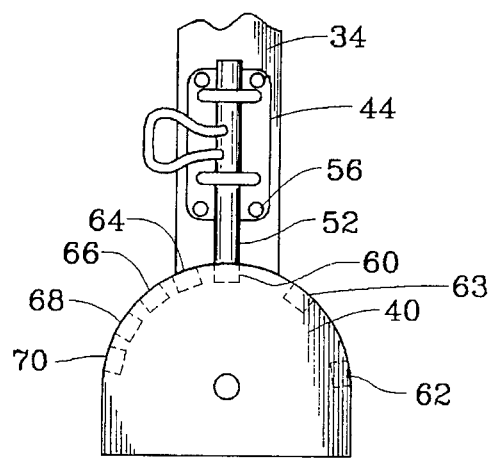
FIG. 3 is a partial side view of the latch mechanism engaging the pivot member.

Referring now to FIG. 3, a first embodiment is shown of a first locking mechanism in which hasp 44 is coupled to a side of leg member 34 by a plurality of mounting screws 56. The hasp includes locking bolt 52 which can be inserted into first pivot member 40 along any one of the apertures located along the upper surface of the first pivot member 40. By way of illustration, lock bolt 52 is inserted into aperture 60 for maintaining leg member 34 in an upright position. Aperture 62 is provided for insertion of the lock bolt 52 when the support bracket is placed into a storage position. Aperture 64, 66 and 68 provide angular positioning of the leg member and aperture 70 maintains the leg position in a substantially parallel plane to the planar support member when the device is used as a creeper. It is noted that leg member 36 and second pivot member 42, as shown in FIG. 1, includes a second locking mechanism forming a mirror image of the first locking mechanism.

Figure 4:
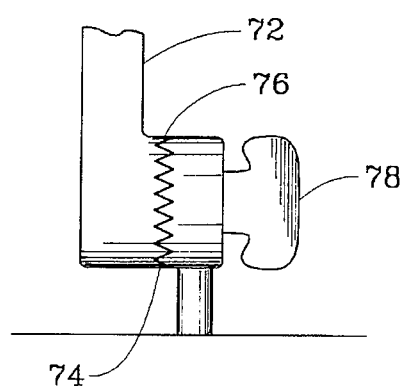
FIG. 4 is a partial end view of a latch mechanism forming a second embodiment.

Referring now to FIG. 4, a second embodiment is shown of the locking mechanism with a side view of leg member 72 placed in an upright position. A lower portion 74 of the leg member includes a plurality of teeth for engagement of pinion support member having reciprocal teeth 76. Handle 78 is rotated along a screw thread, not shown, to provide a separation between the teeth allowing movement of leg member 72 to a particular position. The handle 78 is tightened to engage the teeth members thereby maintaining the leg member in a fixed position.

Figure 5:
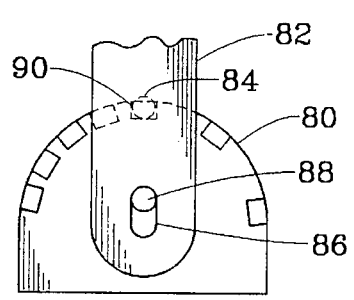
FIG. 5 is a side view of a slotted tap insert forming a third embodiment of the latch mechanism.

Now referring to FIG. 5, set forth is a third embodiment of a latching mechanism having pivot member 80 mounted to the upper surface of the platform along each front corner edge as previously described in the first two embodiments. In this embodiment, leg member 82 includes a fixed locking pin 84 extending perpendicular to a side surface of the leg member 82 and is operatively associated with a slotted aperture 86 for placement over pivot pin 88. In this embodiment, leg member 82 is secured in position by placement of locking pin 84 into any one of the apertures as depicted by numeral 90. If the leg member 82 is to be repositioned, the support bracket is lifted thereby causing leg member 82 to rise with locking pin 84 extending upwardly over the opening to the aperture 90 as provided by slot 86, wherein leg member 82 is moved to the desired position and locking pin 84 is placed into the appropriate aperture with slot 86 allowing the leg member to be reinserted into the locked position. The slot 86 allows the leg member to rotate as well as limit movement.

Figure 6:
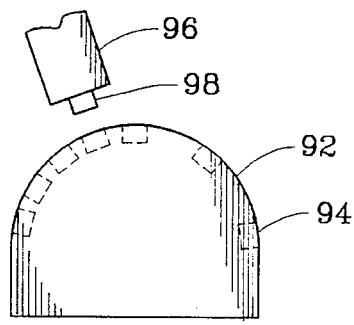
FIG. 6 is a partial cross-sectional side view of an insertion tab providing a fourth embodiment of the latch mechanism.

Now referring to FIG. 6, set forth is yet another embodiment of the latching mechanism. In this embodiment pivot member 92 includes a plurality of apertures 94 located around the periphery of the upper surface of the pivot member 92. Leg member 96 includes an insertion tab 98 positioned on the end of the leg member 96 available for placement within any of said apertures. In operation, leg member 96 is simply lifted thus allowing disengagement of insertion tab 98 from the aperture and allowing appropriate relocation to a desired position, with reinsertion of the insertion tab 98 into the aperture 94 thereby securely locking the leg member in position.

Figure 7:
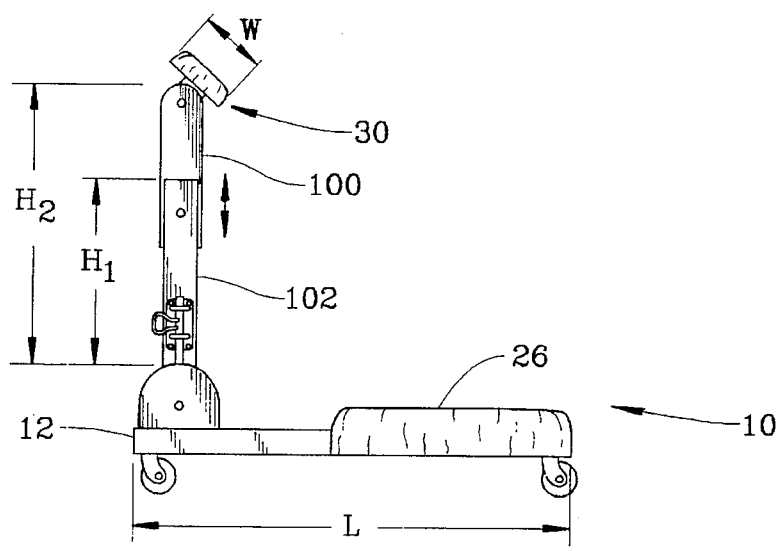
FIG. 7 is a side view of the instant invention having an adjustable support bracket.

Now referring to FIG. 7, set forth is a side view of the service cart 10 having platform 12 with cushion 26 mounted to the upper surface of the platform. The length "L" of the platform is approximately twenty-one inches providing a support for kneeling or sitting with the required stability when leaning over the support bracket 30. The support bracket 30 preferably has a width "W" of approximately four inches. Each leg member in this embodiment has an upper portion 100 and a lower portion 102 which allows the adjustable raising/lowering of the support bracket 30 between a first height $H_1$ of approximately eighteen inches to a second height $H_2$ of approximately twenty-five inches thus further providing comfort to the user of the device.

It is to be understood that while I have illustrated and described certain forms of my invention, it is not to be limited to the specific forms or arrangement of parts herein described and shown. It will be readily apparent to those skilled in the art that various changes may be made without departing from the scope of the invention and the invention is not to be considered limited to what is shown in the drawings and described in the specification.

What is claimed is:

1. A utility cart comprising:

a rigid planar platform defined by a front edge, a rear edge, a first and second side edge, an upper surface and a lower surface; first pivot member means secured to said upper surface adjacent said front edge and said first side edge; second pivot member means secured to said upper surface adjacent said front edge and said second side edge; a support bracket having a first leg coupled with a pivoting means to said first pivot member at a proximal end of said first leg and a second leg coupled with a pivoting means to said second pivot member at a proximal end of said second leg with a cross brace coupled to a distal end of each said first and second leg, said first and second leg pivotally movable between a storage position defined by the juxtapositioning of said cross brace to said upper surface of said platform, and an open position defined by placement of each said leg in a horizontal plane parallel to said upper surface extending outwardly from said front edge, said first and second legs having parallel longitudinal axes; latch means extending above said upper surface for locking said first and second legs to said pivot member means in a position between said open and closed position; and a plurality of wheels removably secured to said lower surface of said platform.

2. The cart according to claim 1 wherein said cross brace is further defined as a substantially rectangular rigid structure having a first side surface with a pad secured thereto and a second side surface coupled with a pivoting means to said distal end of said first and second leg.

3. The cart according to claim 1 including a cushion secured to a portion of said upper surface of said platform.

4. The cart according to claim 1 wherein each said pivot means includes an upright positioning aperture disposed at a perpendicular position to said planar platform, an outward positioning aperture disposed horizontally parallel to said planar platform, and a plurality of positioning apertures disposed therebetween, each said positioning aperture operatively associated with said latch means.

5. The cart according to claim 1 wherein said latch means is defined as a slidable lock bolt with a hasp mounted to each said leg, parallel to a longitudinal axis of each said leg and adjacent a pivot member, said slidable lock bolt securing each leg upon insertion of a free end of said slidable lock bolt into an aperture located in each said pivot member, a non-free end of said slidable lock bolt retained in said hasp.

6. The cart according to claim 1 wherein said latch means is defined as a fixed lock bolt mounted perpendicular to a side wall of each said leg, said lock bolt insertable into an aperture located in each said pivot member.

7. The cart according to claim 1 wherein each said leg includes an adjustment bracket for extending the length of each said leg.

* * * * *